United States Patent [19]
Kirk

[11] 3,941,011
[45] Mar. 2, 1976

[54] HANDLEBAR SHOCK ABSORBER

[76] Inventor: Norbert A. Kirk, 43 E. Ohio St., Chicago, Ill. 60611

[22] Filed: Sept. 10, 1974

[21] Appl. No.: 504,707

[52] U.S. Cl. ............................. 74/551.2; 267/154
[51] Int. Cl.² ....................................... B61K 21/14
[58] Field of Search ........ 267/154; 74/551.8, 551.2; 280/283

[56] References Cited
UNITED STATES PATENTS
| | | | |
|---|---|---|---|
| 1,060,442 | 4/1913 | Erickson | 74/551.2 |
| 2,523,402 | 9/1950 | Townsend | 74/551.2 |

FOREIGN PATENTS OR APPLICATIONS
| | | | |
|---|---|---|---|
| 578,161 | 6/1946 | United Kingdom | 74/551.2 |

Primary Examiner—James B. Marbert
Attorney, Agent, or Firm—Larson, Taylor and Hinds

[57] ABSTRACT

A bicycle handlebar shock absorber for use with conventional handlebar support brackets, comprising a curved strip of flexible material which is adapted at one end thereof to be fixedly mounted on the head of the support bracket and at the other end thereof to be fixedly attached to the handlebar itself on both sides of the bracket clamp supporting the handlebar. With the shock absorber mounted on a bicycle, the bracket clamp is adjusted to allow rotational, but not radial, movement of the handlebar, and the flexible strip of the shock absorber acts as a torsion spring to dampen rotational movement of the handlebar induced by travel of the bicycle over rough terrain.

6 Claims, 2 Drawing Figures

HANDLEBAR SHOCK ABSORBER

BACKGROUND OF THE INVENTION

This invention relates generally to shock absorbers, and, more particularly, to shock absorbers for the handlebars of bicycles.

With the growing concern over pollution of the environment and conservation of energy resources, the bicycle is enjoying a resurgence in popularity as people discover the advantages and economies of this pollution-free means of transportation. Still others, seeking relief from an ever more hectic and crowded existence in modern society, have rediscovered the pleasures of bicycling as a form of recreation and healthful exercise.

However, as bicycle use has grown, many people, long accustomed to the soft ride provided by the modern automobile, have been rudely awakened to the much stiffer ride provided by the typical bicycle. At the same time, commuters, cross-country enthusiasts, and others who make more than occasional use of their bicycles have discovered both the wear and tear to cycle and rider, and particularly the safety hazards for the rider which are posed by negotiating shock-absorberless bicycles over pot-holed city streets, "rustic" bicycle paths, and rural back roads. Of special concern has been the fatique and difficulty of control caused by handlebars not equipped with some means for absorbing the vibrations and shocks of travel over rough terrain.

Shock absorbers for bicycle handlebars are known in the art, but they generally are either complex, bulky, or relatively fragile in design, or are difficult to mount on a bicycle, requiring many adjustments or specially-adapted handlebars and other parts for their use.

BRIEF SUMMARY OF THE INVENTION

The above mentioned problems associated with the prior art are overcome by the shock absorber of the present invention, wherein a curved strip of flexible material is adapted at one end thereof for fixedly mounting the shock absorber on the head of conventional handlebar support brackets, and is adapted at the other end thereof for rigid attachment to the handlebar itself on both sides of the bracket clamp supporting the handlebar. Whereas the handlebar of a bicycle not equipped with the present invention is typically rigidly held by the clamp of the support bracket, when the shock absorber of the present invention is attached, the bracket clamp is loosened to allow rotational and lateral but not radial movement of the handlebar with the clamp. The flexible strip then operates as a torsional spring to dampen the rotational movement of the handlebar which is induced by travel of the bicycle over rough terrain, while the mounting means attaching the shock absorber to the handlebars prevents lateral movement of the handlebar within the support bracket clamp. Other features and advantages of the invention will be set forth in, or apparent from, the detailed description of the preferred embodiments found hereinbelow.

DETAILED DESCRIPTION

Figures 1, 2:
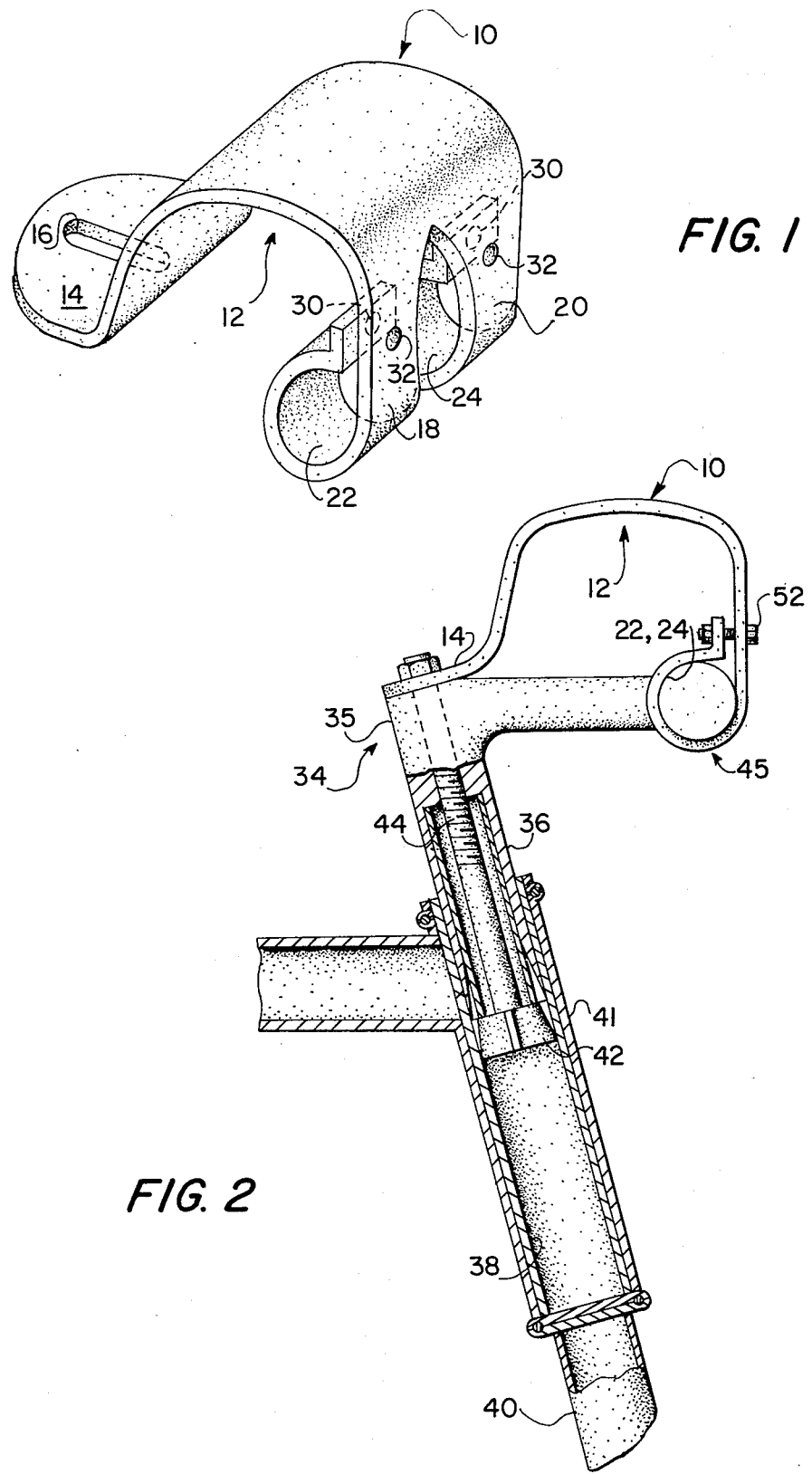
FIG. 1 is a perspective view of a preferred embodiment of the invention.
FIG. 2 is a side-elevational view of a bicycle, partially in section and partially broken away, with a preferred embodiment of the invention mounted on the handlebar support bracket.

Referring to FIG. 1, the shock absorber of the present invention comprises a single curved flexible strip generally denoted 10, which may advantageously be constructed from any flexible, spring-like material, such as metal or plastic. The central portion 12 of strip 10 forms a U-shaped curve, the curvature of which may be varied in different embodiments of the invention to accommodate different handlebar mounting configurations. At one end of portion 12 the curvature of strip 10 abruptly changes to form planar portion 14, which is slightly inclined downwardly from the horizontal. Portion 14 contains an elongated slot 16 oriented longitudinally for receiving the handlebar post bolt (not shown) and thus effectuating attachment of strip 10 to the bicycle frame. The elongated aspect of slot 16 facilitates attachment of strip 10 to a range of handlebar mounting configurations. Toward the other end of portion 12, and past its midpoint in the preferred embodiment, strip 10 becomes bifurcated, forming two identical branches, 18 and 20, respectively, which each recurve inwardly near their extremities to form arcuate, open-ended clamping loops 22 and 24. Near the free ends of loops 22 and 24, the degree of curvature changes relatively abruptly to allow loops 22 and 24 to merge into planar portions 26 and 28, which are spaced from and relatively parallel to the opposing faces of branches 18 and 20, respectively. Each portion 26 and 28 has located therein hole 30 and each branch 18 and 20 has located therein hole 32 relatively opposite to the corresponding hole 30 so as to allow clamping loops 22 and 24 to be tightened about the handlebars of a bicycle by means of a bolt (not shown) inserted through the corresponding holes 30 and 32 associated with each loop 22 and 24.

Referring to FIG. 2, the invention is shown mounted on a typical bicycle front end. Handlebar support bracket 34 comprises head 35, from which hollow support post 36 extends downward for mounting in hollowing steering column 38 of fork stem 40. Steering column 38 is in turn rotatably mounted in tubular frame 41 of the bicycle. Independent vertical and rotational movement of post 36 with respect to steering column 38 is prevented once the handlebar (not shown) has been adjusted to the desired height and orientation by means of tapered nut 42 located within the hollow interior portion of post 36. Nut 42 is tightened so as to expand the lower portion of post 36 against the inner face of column 38 by means of threaded bolt 44 mounted through bracket head 35. Support bracket 34 further comprises support stem 43 extending outward from head 35. The free end of stem 41 forms mounting clamp 45, which receives the bicycle handlebar.

The present invention is mounted on a bicycle by attaching clamping loops 22 and 24 to the bicycle handlebar such that clamp 45 is interposed between loops 22 and 24. Clamp 45, which is normally tightened to rigidly hold the handlebar, is loosened to allow rotational and lateral, but not radial, movement of the handlebar. In an alternative embodiment of the invention, that portion of the handlebar within clamp 45 may be wrapped with tape or other cushioning material before strip 10 is mounted on the bicycle. With bolt 44 removed from nut 42 and bracket 34, planar portion 14 of strip 10 is oriented over head 35 of bracket 34 so that slot 16 is aligned to allow reinsertion of bolt 44 in bracket 34 through slot 16. With bolt 44 reinserted in bracket 34 of nut 42 reattached to bolt 44, bracket 34 is adjusted in steering column 38 for the desired height and orientation of the handlebar. As nut 42 is tightened, bolt 44 fixedly anchors strip 10 to bracket head 35. Clamping loops 22 and 24 are tightened by means of bolts 52 inserted through the corresponding pairs of holes 30 and 32 associated with each loop 22 and 24.

The operation of the present invention is extremely simple. Shocks transmitted through the wheels, frame, etc., are normally transmitted substantially undiminished to the handlebars by bracket 34 and clamp 45 thereof in a bicycle not equipped with the present invention. In a bicycle equipped with the present invention, clamp 45 is loosened to allow shock-induced rotation in the handlebars. Lateral movement of the handlebar within clamp 45 is prevented by loops 22 and 24 straddling clamp 45 and fixedly holding the handlebar, and the rotation of the handlebar is substantially dampened by the torsion spring action of flexible strip 10 connected between bracket head 35 and the handlebars. Instead of a series of jarring shocks, the rider of a bicycle equipped with the present invention experiences only a gentle oscillation of the handlebars when rough terrain is encountered.

It will be appreciated by those skilled in the art that although the invention has been described relative to exemplary embodiments thereof, modifications and variations can be effected in these embodiments without departing from the scope and spirit of the invention.

I claim:

1. A bicycle handlebar shock absorber for use with a support bracket for the handlebar of a bicycle, said support bracket comprising a head, a hollow support post extending downward from said head for attaching said support bracket to said bicycle, a support stem extending outward from said head, said support stem further comprising a mounting clamp extending from the free end thereof for receiving the handlebar of said bicycle in a manner which allows rotational and lateral, but substantially no radial movement of said handlebar, within said clamp, and said support bracket further comprising a bolt removably inserted through said head into the interior of said support post for fixedly attaching said support bracket to said bicycles, and said shock absorber for said bicycle handlebar comprising a curved flexible strip member producing torsional spring action, and having at one end a first mounting means for fixedly attaching said flexible strip member to said bracket head, and having at its other end a second mounting means for fixedly securing said other end of said flexible strip member to said handlebar at positions adjacent to either side of said mounting clamp such that the lateral movement of said handlebar allowed by said clamp is prevented by said second mounting means and the rotational movement allowed by said clamp is dampened by said spring action of said flexible strip member extending between said handlebar and said support bracket head.

2. The shock absorber of claim 1 wherein said flexible strip member comprises a U-shaped portion oriented with respect to said mounting means such that said flexible strip member curves upward from said mounting means when said shock absorber is mounted on said bicycle support bracket.

3. The shock absorber of claim 2 wherein said first mounting means for fixed attachment of said flexible strip member to said support bracket head is adjustable to facilitate attachment of said shock absorber to bicycles having different configurations of support bracket.

4. The shock absorber of claim 3 wherein said adjustable first mounting means comprises a substantially planar strip member extending from the end of said flexible strip member for engagement with the top of said support bracket head, and an elongated slot for receiving said support bracket bolt in a manner such that said bolt fixedly secures said planar strip member to said bracket head when said bolt is tightened to fixedly attach said support bracket to said bicycle.

5. The shock absorber of claim 4 wherein said second mounting means comprises a pair of spaced clamping loops extending from said flexible strip member, and means for tightening said loops fixedly about said handlebar.

6. The shock absorber of claim 5 wherein said flexible strip member, said first mounting means, and said clamping loops of said second mounting means are constructed from a single unitary flexible strip and said flexible strip member bifurcates to form said clamping loops.

* * * * *